United States Patent
Madhur Comandur et al.

(10) Patent No.: US 12,526,346 B2
(45) Date of Patent: Jan. 13, 2026

(54) TECHNIQUES FOR SELECTIVE RE-COMPRESSION OF ROBUST HEADER COMPRESSION PACKETS

(71) Applicant: QUALCOMM Incorporated, San Diego, CA (US)

(72) Inventors: Ashwin Madhur Comandur, San Diego, CA (US); Leena Zacharias, San Jose, CA (US); Vishal Dalmiya, San Diego, CA (US); Vaishakh Rao, San Diego, CA (US); Vinay Rajkumar Patil, San Diego, CA (US); Rudhir Varna Upretee, San Diego, CA (US); Saket Bathwal, Hyderabad (IN); Shailesh Maheshwari, San Diego, CA (US); Vinay Paradkar, Broomfield, CO (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/998,112

(22) PCT Filed: Dec. 4, 2020

(86) PCT No.: PCT/US2020/070863
§ 371 (c)(1),
(2) Date: Nov. 7, 2022

(87) PCT Pub. No.: WO2021/262248
PCT Pub. Date: Dec. 30, 2021

(65) Prior Publication Data
US 2023/0179685 A1 Jun. 8, 2023

(30) Foreign Application Priority Data
Jun. 22, 2020 (IN) .............................. 202041026240

(51) Int. Cl.
*H04L 69/04* (2022.01)
*H04L 47/32* (2022.01)

(52) U.S. Cl.
CPC .............. *H04L 69/04* (2013.01); *H04L 47/32* (2013.01)

(58) Field of Classification Search
CPC ................................ H04L 47/32; H04L 69/04
See application file for complete search history.

(56) References Cited

U.S. PATENT DOCUMENTS

| 11,445,049 B2 * | 9/2022 | Kwon .................. H04N 21/643 |
| 2010/0034187 A1 | 2/2010 | Kumar et al. |

(Continued)

FOREIGN PATENT DOCUMENTS

| KR | 20140094139 A | 7/2014 |

OTHER PUBLICATIONS

International Search Report and Written Opinion—PCT/US2020/070863—ISA/EPO—Feb. 26, 2021.

(Continued)

*Primary Examiner* — Harry H Kim
*Assistant Examiner* — M Mostazir Rahman
(74) *Attorney, Agent, or Firm* — Dalei Dong; Harrity & Harrity, LLP

(57) ABSTRACT

Various aspects of the present disclosure generally relate to wireless communication. In some aspects, a wireless communication device may determine to discard a number of packets from a plurality of packets included in a packet stream. The plurality of packets may be associated with a context. The wireless communication device may determine that the number of packets to discard does not satisfy a threshold associated with the context. The wireless communication device may discard the number of packets. The wireless communication device may transmit the plurality of (Continued)

packets after discarding the number of packets based at least in part on the determination that the number of packets does not satisfy the threshold. Numerous other aspects are provided.

20 Claims, 12 Drawing Sheets

(56) References Cited

U.S. PATENT DOCUMENTS

| | | | |
|---|---|---|---|
| 2012/0189023 A1 | 7/2012 | Huang et al. | |
| 2015/0256653 A1* | 9/2015 | Ambriss | H04W 28/0231 |
| | | | 370/235 |
| 2016/0337487 A1* | 11/2016 | Kwon | H04N 21/6131 |
| 2017/0006496 A1* | 1/2017 | Jung | H04L 69/04 |
| 2017/0302941 A1* | 10/2017 | Liu | H04N 19/172 |
| 2019/0166057 A1* | 5/2019 | Gilson | H04L 65/1069 |
| 2019/0166059 A1 | 5/2019 | Lee et al. | |

OTHER PUBLICATIONS

Jonsson K.L-E, et al., "The RObust Header Compression (ROHC) Framework; draft-ietf-rohc-rfc4995bis-03.txt," The Robust Header Compression (ROHC) Framework; DRAFT-IETF-ROHC-RFC4995BIS-03.TXT, Internet Engineering Task Force, IETF; Standardworkingdraft, Internet Society (ISOC) , Rue Des Falaises, CH-1205, Geneva, Switzerland. No. 3, Jan. 13, 2010 (Jan. 13, 2010), pp. 1-42. XP015066249, [retrieved on Jan. 13, 2010] paragraph [5.1.1].

* cited by examiner

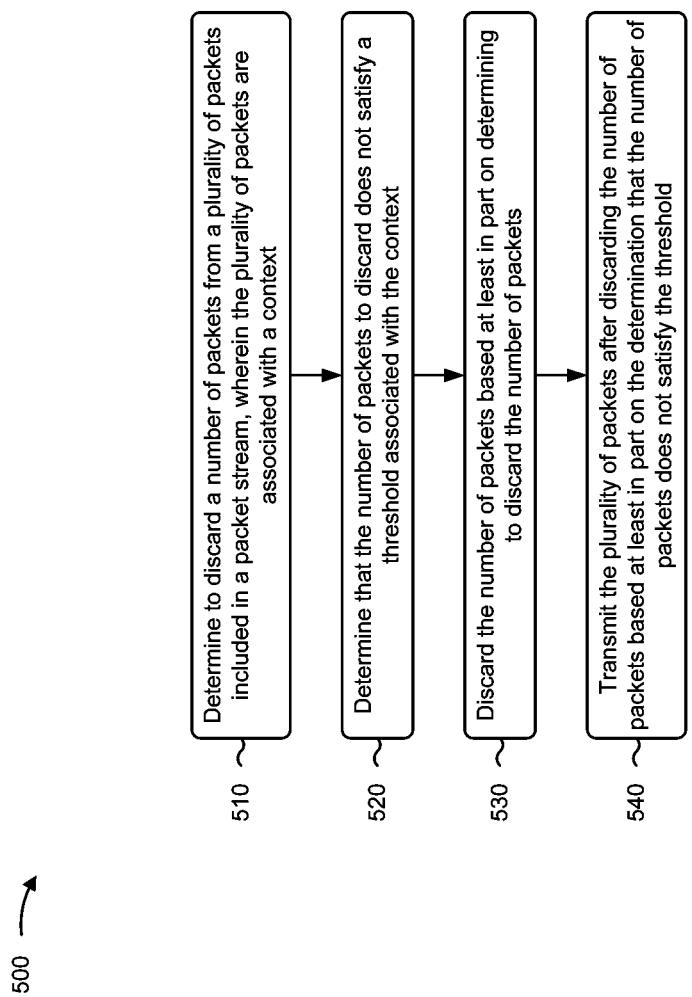

TECHNIQUES FOR SELECTIVE RE-COMPRESSION OF ROBUST HEADER COMPRESSION PACKETS

CROSS-REFERENCE TO RELATED APPLICATION APPLICATIONS

This Patent Application is a 371 national stage of PCT Application PCT/US2020/070863, filed on Dec. 4, 2020, entitled "TECHNIQUES FOR SELECTIVE RE-COMPRESSION OF ROBUST HEADER COMPRESSION PACKETS," which claims priority to Indian Patent Application number 202041026240, filed on Jun. 22, 2020, entitled "TECHNIQUES FOR SELECTIVE RE-COMPRESSION OF ROBUST HEADER COMPRESSION PACKETS," which are hereby expressly incorporated by reference herein.

FIELD OF THE DISCLOSURE

Aspects of the present disclosure generally relate to wireless communication and to techniques and apparatuses for selective re-compression of robust header compression packets.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes determining to discard a number of packets from a plurality of packets included in a packet stream, wherein the plurality of packets are associated with a context; determining that the number of packets to discard does not satisfy a threshold associated with the context; discarding the number of packets based at least in part on determining to discard the number of packets; and transmitting the plurality of packets after discarding the number of packets based at least in part on the determination that the number of packets does not satisfy the threshold.

In some aspects, the method further comprises determining to discard a second number of packets from a second plurality of packets included in the packet stream, wherein the second number of packets and the second plurality of packets are associated with a second context, determining that the second number of packets satisfies a threshold associated with the second context, and re-compressing the second plurality of packets after discarding the second number of packets based at least in part on determining that the second number of packets satisfies the threshold associated with the second context. In some aspects, the threshold associated with the context and the threshold associated with the second context are different thresholds.

In some aspects, the method further comprises dynamically determining the threshold associated with the context based at least in part on at least one of a number of bits used to compress the plurality of packets, a loss tolerance for the plurality of packets, or a profile used to compress the plurality of packets. In some aspects, the plurality of packets are compressed using robust header compression (RoHC) and the context is an RoHC context.

In some aspects, a method of wireless communication performed by a wireless communication device includes determining to discard a number of packets from a plurality of packets included in a packet stream, wherein at least a subset of the plurality of packets are compressed, wherein the number of packets are uncompressed packets, and wherein the number of packets and the plurality of packets are associated with a context; determining that the number of packets satisfies a threshold associated with the context; discarding the number of packets based at least in part on determining to discard the number of packets; and transmitting the plurality of packets after discarding the number of packets based at least in part on the determination that the number of packets are uncompressed packets.

In some aspects, the method further comprises dynamically determining the threshold associated with the context based at least in part on at least one of a number of bits used to compress the plurality of packets, a loss tolerance for the plurality of packets, or a profile used to compress the plurality of packets. In some aspects, the at least the subset of the plurality of packets are compressed using RoHC and the context is an RoHC context.

In some aspects, a non-transitory computer-readable medium storing a set of instructions for wireless communication includes one or more instructions that, when executed by one or more processors of a wireless communication device, cause the wireless communication device to: determine to discard a number of packets from a plurality of packets included in a packet stream, wherein the plurality of packets are associated with a context; determine that the number of packets to discard does not satisfy a threshold associated with the context; discard the number of packets based at least in part on determining to discard the number of packets; and transmit the plurality of packets after discarding the number of packets based at least in part on the determination that the number of packets does not satisfy the threshold.

In some aspects, the one or more instructions further cause the wireless communication device to determine to discard a second number of packets from a second plurality of packets included in the packet stream, wherein the second number of packets and the second plurality of packets are associated with a second context, determine that the second number of packets satisfies a threshold associated with the second context, and re-compress the second plurality of packets after discarding the second number of packets based at least in part on determining that the second number of packets satisfies the threshold associated with the second context.

In some aspects, the threshold associated with the context and the threshold associated with the second context are different thresholds. In some aspects, the one or more instructions further cause the wireless communication device to dynamically determine the threshold associated with the context based at least in part on at least one of a number of bits used to compress the plurality of packets, a loss tolerance for the plurality of packets, or a profile used to compress the plurality of packets. In some aspects, the plurality of packets are compressed using RoHC and the context is an RoHC context.

In some aspects, a non-transitory computer-readable medium storing a set of instructions for wireless communication includes one or more instructions that, when executed by one or more processors of a wireless communication device, cause the wireless communication device to: determine to discard a number of packets from a plurality of packets included in a packet stream, wherein at least a subset of the plurality of packets are compressed, wherein the number of packets are uncompressed packets, and wherein the number of packets and the plurality of packets are associated with a context; determine that the number of packets satisfies a threshold associated with the context; discard the number of packets based at least in part on determining to discard the number of packets; and transmit the plurality of packets after discarding the number of packets based at least in part on the determination that the number of packets are uncompressed packets.

In some aspects, the one or more instructions further cause the wireless communication device to dynamically determine the threshold associated with the context based at least in part on at least one of a number of bits used to compress the plurality of packets, a loss tolerance for the plurality of packets, or a profile used to compress the plurality of packets. In some aspects, the at least the subset of the plurality of packets are compressed using RoHC and the context is an RoHC context.

In some aspects, a wireless communication device for wireless communication includes a memory and one or more processors operatively coupled to the memory, the memory and the one or more processors configured to: determine to discard a number of packets from a plurality of packets included in a packet stream, wherein the plurality of packets are associated with a context; determine that the number of packets to discard does not satisfy a threshold associated with the context; discard the number of packets based at least in part on determining to discard the number of packets; and transmit the plurality of packets after discarding the number of packets based at least in part on the determination that the number of packets does not satisfy the threshold.

In some aspects, the one or more processors are further configured to determine to discard a second number of packets from a second plurality of packets included in the packet stream, wherein the second number of packets and the second plurality of packets are associated with a second context, determine that the second number of packets satisfies a threshold associated with the second context, and re-compress the second plurality of packets after discarding the second number of packets based at least in part on determining that the second number of packets satisfies the threshold associated with the second context. In some aspects, the threshold associated with the context and the threshold associated with the second context are different thresholds.

In some aspects, the one or more processors are further configured to dynamically determine the threshold associated with the context based at least in part on at least one of a number of bits used to compress the plurality of packets, a loss tolerance for the plurality of packets, or a profile used to compress the plurality of packets. In some aspects, the plurality of packets are compressed using RoHC and the context is an RoHC context.

In some aspects, a wireless communication device for wireless communication includes a memory; and one or more processors operatively coupled to the memory, the memory and the one or more processors configured to: determine to discard a number of packets from a plurality of packets included in a packet stream, wherein at least a subset of the plurality of packets are compressed, wherein the number of packets are uncompressed packets, and wherein the number of packets and the plurality of packets are associated with a context; determine that the number of packets satisfies a threshold associated with the context; discard the number of packets based at least in part on determining to discard the number of packets; and transmit the plurality of packets after discarding the number of packets based at least in part on the determination that the number of packets are uncompressed packets.

In some aspects, the one or more processors are further configured to dynamically determine the threshold associated with the context based at least in part on at least one of a number of bits used to compress the plurality of packets, a loss tolerance for the plurality of packets, or a profile used to compress the plurality of packets. In some aspects, the at least the subset of the plurality of packets are compressed using RoHC and the context is an RoHC context.

In some aspects, an apparatus for wireless communication includes means for determining to discard a number of packets from a plurality of packets included in a packet stream, wherein the plurality of packets are associated with a context; means for determining that the number of packets to discard does not satisfy a threshold associated with the context; means for discarding the number of packets based at least in part on determining to discard the number of packets; and means for transmitting the plurality of packets after discarding the number of packets based at least in part on the determination that the number of packets does not satisfy the threshold.

In some aspects, the apparatus further comprises means for determining to discard a second number of packets from a second plurality of packets included in the packet stream, wherein the second number of packets and the second plurality of packets are associated with a second context; means for determining that the second number of packets satisfies a threshold associated with the second context; and means for re-compressing the second plurality of packets after discarding the second number of packets based at least in part on determining that the second number of packets satisfies the threshold associated with the second context. In some aspects, the threshold associated with the context and the threshold associated with the second context are different thresholds.

In some aspects, the apparatus further comprises means for dynamically determining the threshold associated with the context based at least in part on at least one of a number of bits used to compress the plurality of packets, a loss tolerance for the plurality of packets, or a profile used to compress the plurality of packets. In some aspects, the plurality of packets are compressed using RoHC and the context is an RoHC context.

In some aspects, an apparatus for wireless communication includes means for determining to discard a number of packets from a plurality of packets included in a packet stream, wherein at least a subset of the plurality of packets are compressed, wherein the number of packets are uncompressed packets, and wherein the number of packets and the plurality of packets are associated with a context; means for determining that the number of packets satisfies a threshold associated with the context; means for discarding the number of packets based at least in part on determining to discard the number of packets; and means for transmitting the plurality of packets after discarding the number of packets based at least in part on the determination that the number of packets are uncompressed packets.

In some aspects, the apparatus further comprises means for dynamically determining the threshold associated with the context based at least in part on at least one of a number of bits used to compress the plurality of packets, a loss tolerance for the plurality of packets, or a profile used to compress the plurality of packets. In some aspects, the at least the subset of the plurality of packets are compressed using RoHC and the context is an RoHC context.

In some aspects, a method of wireless communication performed by a wireless communication device includes determining a first set of packets to be discarded from a second set of packets included in a packet stream; determining that a number of the first set of packets satisfies a threshold; discarding, based at least in part on the determination that the number of the first set of packets satisfies the threshold, a third set of packets from the second set of packets such that a number of the third set of packets does not satisfy the threshold, wherein the third set of packets is at least a subset of the first set of packets; and transmitting the second set of packets after discarding the first set of packets from the second set of packets.

In some aspects, the threshold is less or equal to a loss tolerance for the second set of packets. In some aspects, discarding the third set of packets comprises discarding packets from the first set of packets at a rate that satisfies the loss tolerance for the second set of packet. In some aspects, the method further includes removing at least a portion of an Internet protocol (IP) packet payload from each packet of fourth set of packets, wherein the fourth set of packets is at least a second subset of the first set of packets, and wherein the fourth set of packets are not discarded.

In some aspects, transmitting the second of packets after discarding the third set of packets comprises transmitting the second of packets after removing at least the portion of the IP packet payload from each packet of the fourth set of packets. In some aspects, the at least the subset of the plurality of the first set of packets are compressed using RoHC and associated with an RoHC context. In some aspects, at least a subset of the second set of packets are compressed. In some aspects, the first set of packets and the second set of packets are associated with a compression context.

In some aspects, a wireless communication device for wireless communication includes a memory and one or more processors operatively coupled to the memory, the memory and the one or more processors configured to: determine a first set of packets to be discarded from a second set of packets included in a packet stream; determine that a number of the first set of packets satisfies a threshold; discard, based at least in part on the determination that the number of the first set of packets satisfies the threshold, a third set of packets from the second set of packets such that a number of the third set of packets does not satisfy the threshold, wherein the third set of packets is at least a subset of the first set of packets; and transmit the second set of packets after discarding the first set of packets from the second set of packets.

In some aspects, the threshold is less or equal to a loss tolerance for the second set of packets. In some aspects, discarding the third set of packets comprises discarding packets from the first set of packets at a rate that satisfies the loss tolerance for the second set of packet. In some aspects, the memory and the one or more processors are further configured to remove at least a portion of an IP packet payload from each packet of fourth set of packets, wherein the fourth set of packets is at least a second subset of the first set of packets, and wherein the fourth set of packets are not discarded.

In some aspects, transmitting the second of packets after discarding the third set of packets comprises transmitting the second of packets after removing at least the portion of the IP packet payload from each packet of the fourth set of packets. In some aspects, the at least the subset of the plurality of the first set of packets are compressed using RoHC and associated with an RoHC context. In some aspects, at least a subset of the second set of packets are compressed. In some aspects, the first set of packets and the second set of packets are associated with a compression context.

In some aspects, a non-transitory computer-readable medium storing a set of instructions for wireless communication includes one or more instructions that, when executed by one or more processors of a wireless communication device, cause the wireless communication device to: determine a first set of packets to be discarded from a second set of packets included in a packet stream; determine that a number of the first set of packets satisfies a threshold; discard, based at least in part on the determination that the number of the first set of packets satisfies the threshold, a third set of packets from the second set of packets such that a number of the third set of packets does not satisfy the threshold, wherein the third set of packets is at least a subset of the first set of packets; and transmit the second set of packets after discarding the first set of packets from the second set of packets.

In some aspects, the threshold is less or equal to a loss tolerance for the second set of packets. In some aspects, discarding the third set of packets comprises discarding packets from the first set of packets at a rate that satisfies the loss tolerance for the second set of packet. In some aspects, the one or more instructions that, when executed by one or more processors of a wireless communication device, cause the wireless communication device to remove at least a portion of an IP packet payload from each packet of fourth set of packets, wherein the fourth set of packets is at least a second subset of the first set of packets, and wherein the fourth set of packets are not discarded.

In some aspects, transmitting the second of packets after discarding the third set of packets comprises transmitting the second of packets after removing at least the portion of the IP packet payload from each packet of the fourth set of packets. In some aspects, the at least the subset of the plurality of the first set of packets are compressed using RoHC and associated with an RoHC context. In some aspects, at least a subset of the second set of packets are compressed. In some aspects, the first set of packets and the second set of packets are associated with a compression context.

In some aspects, an apparatus for wireless communication includes means for determining a first set of packets to be discarded from a second set of packets included in a packet stream; means for determining that a number of the first set of packets satisfies a threshold; means for discarding, based at least in part on the determination that the number of the first set of packets satisfies the threshold, a third set of packets from the second set of packets such that a number of the third set of packets does not satisfy the threshold, wherein the third set of packets is at least a subset of the first set of packets; and means for transmitting the second set of packets after discarding the first set of packets from the second set of packets.

In some aspects, the threshold is less or equal to a loss tolerance for the second set of packets. In some aspects, discarding the third set of packets comprises discarding packets from the first set of packets at a rate that satisfies the loss tolerance for the second set of packet. In some aspects, the apparatus further includes means for removing at least a portion of an IP packet payload from each packet of fourth set of packets, wherein the fourth set of packets is at least a second subset of the first set of packets, and wherein the fourth set of packets are not discarded.

In some aspects, transmitting the second of packets after discarding the third set of packets comprises transmitting the second of packets after removing at least the portion of the IP packet payload from each packet of the fourth set of packets. In some aspects, the at least the subset of the plurality of the first set of packets are compressed using RoHC and associated with an RoHC context. In some aspects, at least a subset of the second set of packets are compressed. In some aspects, the first set of packets and the second set of packets are associated with a compression context.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5 and 6 are diagrams illustrating example processes associated with selective re-compression of robust header compression packets, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
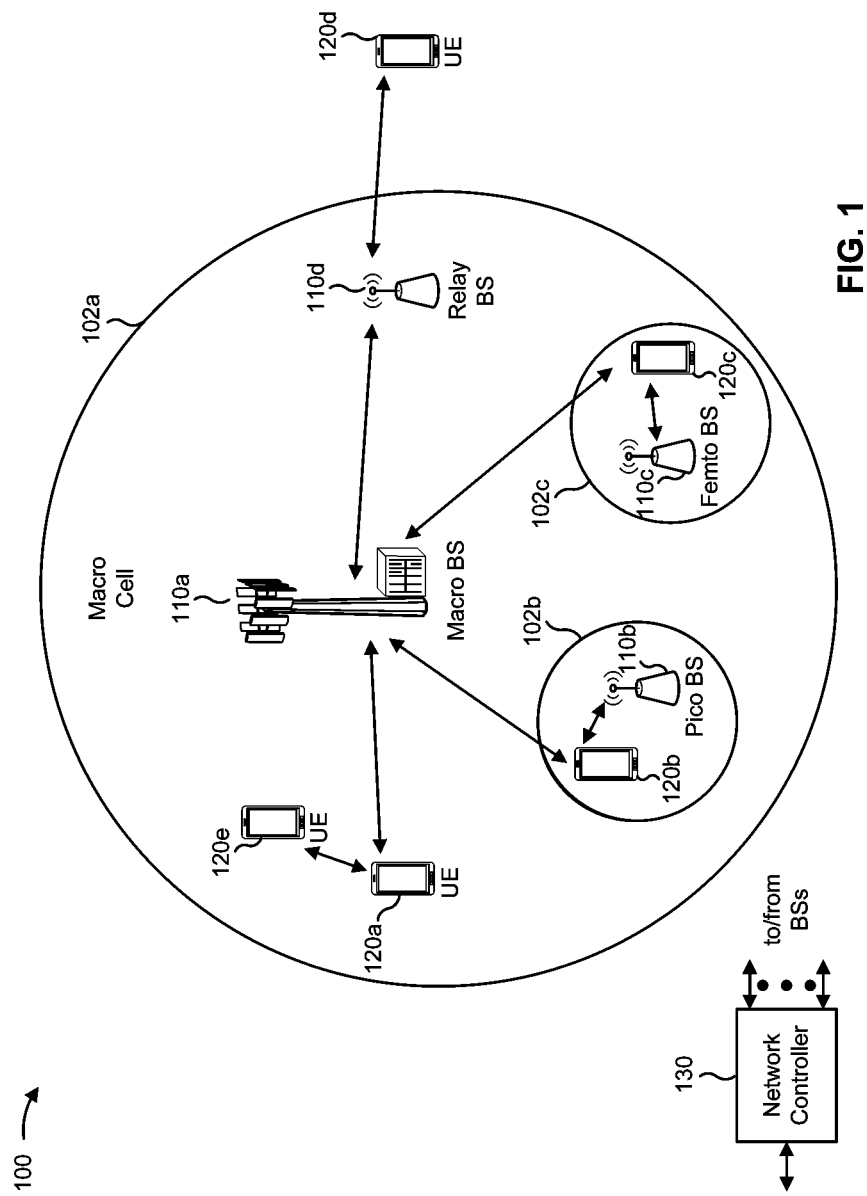
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
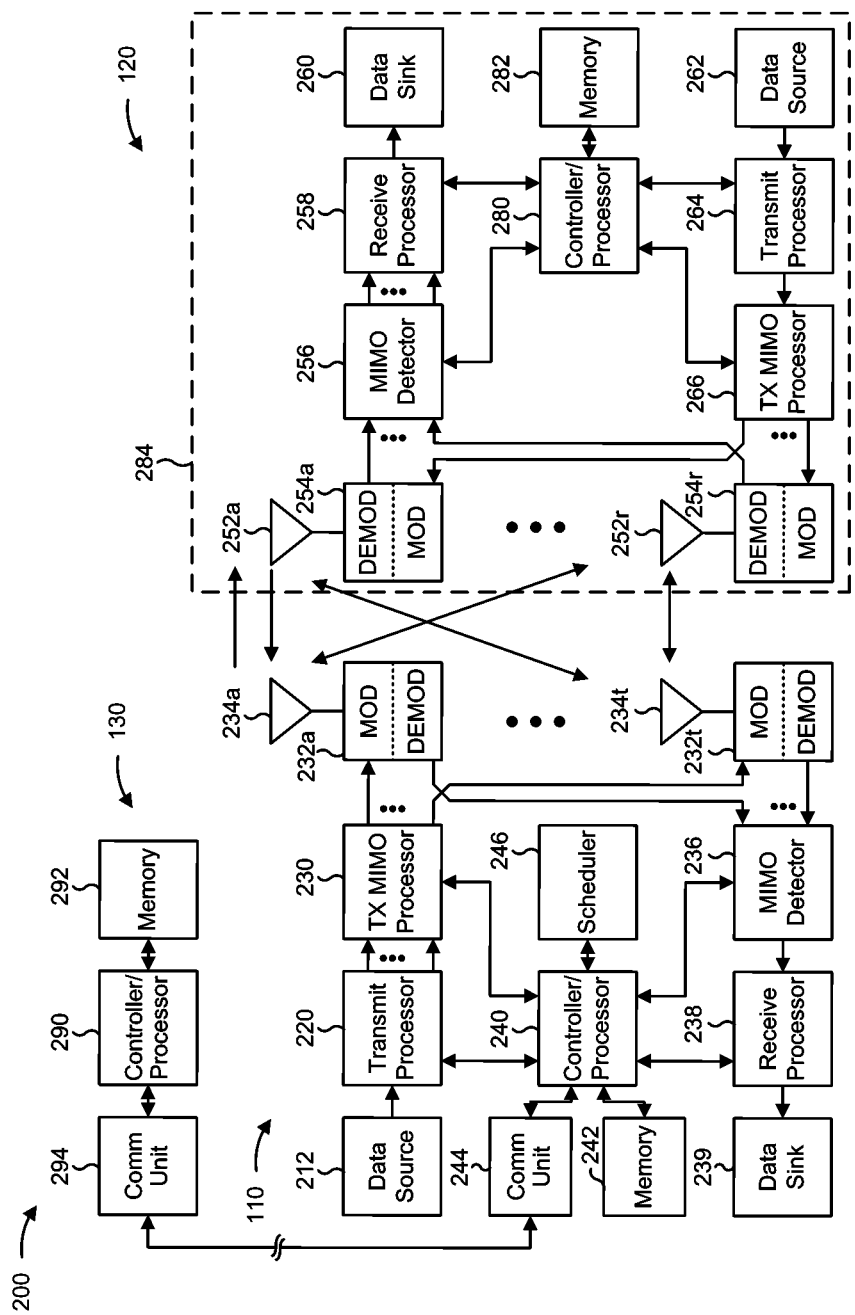
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with selective re-compression of robust header compression (ROHC) packets, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, process 900 of FIG. 9, and/or other processes as described herein. In some aspects, executing instructions may include running the instructions, converting the instructions, compiling the instructions, interpreting the instructions, and/or the like.

In some aspects, UE 120 may include means for determining to discard a number of packets from a plurality of packets included in a packet stream, wherein the plurality of packets are associated with a context, means for determining that the number of packets to discard does not satisfy a threshold associated with the context, means for discarding the number of packets based at least in part on determining to discard the number of packets, means for transmitting the plurality of packets after discarding the number of packets based at least in part on the determination that the number of packets does not satisfy the threshold, and/or the like.

In some aspects, UE 120 may include means for determining to discard a number of packets from a plurality of packets included in a packet stream, wherein at least a subset of the plurality of packets are compressed, wherein the number of packets are uncompressed packets, and wherein the number of packets and the plurality of packets are associated with a context, means for determining that the number of packets satisfies a threshold associated with the context, means for discarding the number of packets based at least in part on determining to discard the number of packets, means for transmitting the plurality of packets after discarding the number of packets based at least in part on the determination that the number of packets are uncompressed packets, and/or the like.

In some aspects, UE 120 may include means for determining a first set of packets to be discarded from a second set of packets included in a packet stream; means for determining that a number of the first set of packets satisfies a threshold; means for discarding, based at least in part on the determination that the number of the first set of packets satisfies the threshold, a third set of packets from the second set of packets such that a number of the third set of packets does not satisfy the threshold, wherein the third set of packets is at least a subset of the first set of packets; means for transmitting the second set of packets after discarding the first set of packets from the second set of packets; and/or the like.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining to discard a number of packets from a plurality of packets included in a packet stream, wherein the plurality of packets are associated with a context, means for determining that the number of packets to discard does not satisfy a threshold associated with the context, means for discarding the number of packets based at least in part on determining to discard the number of packets, means for transmitting the plurality of packets after discarding the number of packets based at least in part on the determination that the number of packets does not satisfy the threshold, and/or the like. In some aspects, base station 110 may include means for determining to discard a number of packets from a plurality of packets included in a packet stream, wherein at least a subset of the plurality of packets are compressed, wherein the number of packets are uncompressed packets, and wherein the number of packets and the plurality of packets are associated with a context, means for determining that the number of packets satisfies a threshold associated with the context, means for discarding the number of packets based at least in part on determining to discard the number of packets, means for transmitting the plurality of packets after discarding the number of packets based at least in part on the determination that the number of packets are uncompressed packets, and/or the like.

In some aspects, base station 110 may include means for determining a first set of packets to be discarded from a second set of packets included in a packet stream; means for determining that a number of the first set of packets satisfies a threshold; means for discarding, based at least in part on the determination that the number of the first set of packets satisfies the threshold, a third set of packets from the second set of packets such that a number of the third set of packets does not satisfy the threshold, wherein the third set of packets is at least a subset of the first set of packets; means for transmitting the second set of packets after discarding the first set of packets from the second set of packets; and/or the like.

In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
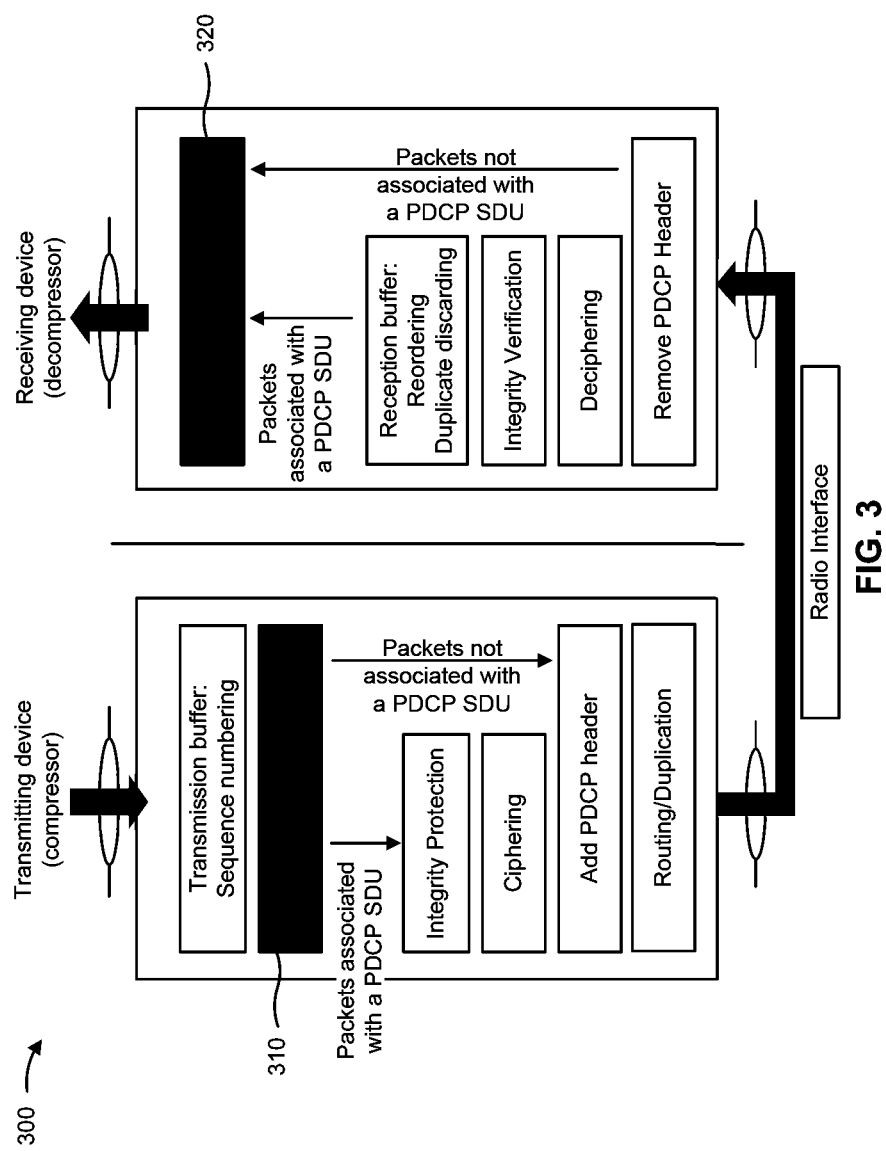
FIG. 3 is a diagram illustrating an example of a compression architecture, in accordance with various aspects of the present disclosure.

FIG. 3 is a diagram illustrating an example 300 of a compression architecture, in accordance with various aspects of the present disclosure. As shown in FIG. 3, the compression architecture includes a transmitting (or compressor) device and a receiving (or decompressor) device. In some cases, the compressor device may be a base station and the decompressor device may be a UE when compression is implemented on a downlink. In some cases, the compressor device may be a UE and the decompressor device may be a base station when compression is implemented on an uplink. In some cases, the compressor device may be a UE and the decompressor device may be another UE when compression is implemented on a sidelink. In some cases, the compressor device may be a base station and the decompressor device may be another base station when compression is implemented on a backhaul.

As shown in FIG. 3, and by reference number 310, the compressor device may perform compression for a packet to be transmitted to the decompressor device. For example, as shown, the compressor device may obtain a data block to be transmitted from transmission buffer and add a sequence number to the data block to form an Ethernet packet, an Internet protocol (IP) packet, transmission control protocol (TCP) packet, a user datagram protocol (UDP) packet, a real-time transport protocol (RTP) packet or another type of packet to be transmitted.

The compressor device may then perform compression to reduce the size of the packet. In some aspects, the compressor device may perform header compression to remove the header (e.g., an Ethernet header, an IP header, a TCP header, a UDP header, an RTP header, or another type of header) from the packet and attach a compression sub-header that includes a context identifier. In some aspects, the compressor may perform uplink data compression (UDC) or another type of data compression to reduce the size of the packet. The compressor device may perform the compression based at least in part on a compression protocol or compression technique, such as RoHC, Ethernet header compression (EHC), UDC, and/or the like.

In some cases, if the packet is associated with a packet data convergence protocol (PDCP) service data unit (SDU), the packet may be subject to integrity protection and/or ciphering. After applying the integrity protection and/or ciphering, and/or if the packet is not associated with a PDCP SDU, the compressor device may add a PDCP header to form a protocol data unit (PDU). The compressor device may then transmit the PDU with the compressed header to the decompressor device via a radio interface (e.g., an access link or Uu interface, a sidelink or PC5 interface, and/or the like).

As further shown in FIG. 3, the decompressor device may receive the PDU from the compressor device via the radio interface and remove the PDCP header from the PDU. In cases where the packet is associated with a PDCP SDU, the decompressor device may perform deciphering and integrity verification on the packet, and the packet may be stored in a reception buffer where incoming packets may be reordered (e.g., based on sequence number), duplicate packets may be discarded, and/or the like if the packet is successfully deciphered and passes integrity verification. As shown by reference number 320, the decompressor device may perform header decompression for the packets in the reception buffer and/or for packets that are not associated with a PDCP SDU. For example, the decompressor device may obtain a context identifier (e.g., an RoHC context identifier or another type of context identifier) from the packet and match the context identifier to information contained in a full header associated with a previous packet.

As indicated above, FIG. 3 is provided as an example. Other examples may differ from what is described with respect to FIG. 3.

In some cases, a wireless communication device may queue compressed packets in a packet stream to be transmitted over a transmission medium to another wireless communication device. If a compressed packet in the packet stream is discarded or removed, the wireless communication device may perform a re-compression of the remaining packets because compression for a particular packet in the packet stream may be based at least in part on the compression of previous packets in the packet stream. As a result, the wireless communication device consumes processing, memory, and battery resources when re-compressing packets in the packet stream each time a compressed packet is discarded from the packet stream.

Some aspects described herein provide techniques and apparatuses for selective re-compression of RoHC packets (and other types of packets). In some aspects, a wireless communication device may be capable of determining whether to re-compress packets in a packet stream on a context-by-context basis. In the framework of transmission and reception of packets (e.g., Ethernet packets, IP packets, and/or the like), a "flow" may refer to a plurality of packets associated with the same tuple. In some cases, the tuple may be a 5-tuple that includes a source address, a destination address, a source port, a destination port, a protocol (e.g., Ethernet, IP, or another protocol). In other cases, the tuple may be a 4-tuple (e.g., a 5-tuple without the protocol information), a 2-tuple (e.g., a source address and a destination address), or another combination of information.

A flow of packets may be assigned to or associated with a context (e.g., an Ethernet context, an RoHC context, or another type of context), which may be identified by a context identifier. Packets from one or more flows may be queued in a packet stream. The wireless communication device may re-compress or may refrain from re-compressing packets for a particular context in the packet stream based at least in part on a number of packets discarded from the packet stream for the context. In this way, the wireless communication device can re-compress subsets of packets in the packet stream as opposed to the entire packet stream. Moreover, determining whether to re-compress packets in a packet stream on a context-by-context basis may result in fewer re-compressions, which reduces processing, memory, and battery resource usage of the wireless communication device.

Figure 4A:
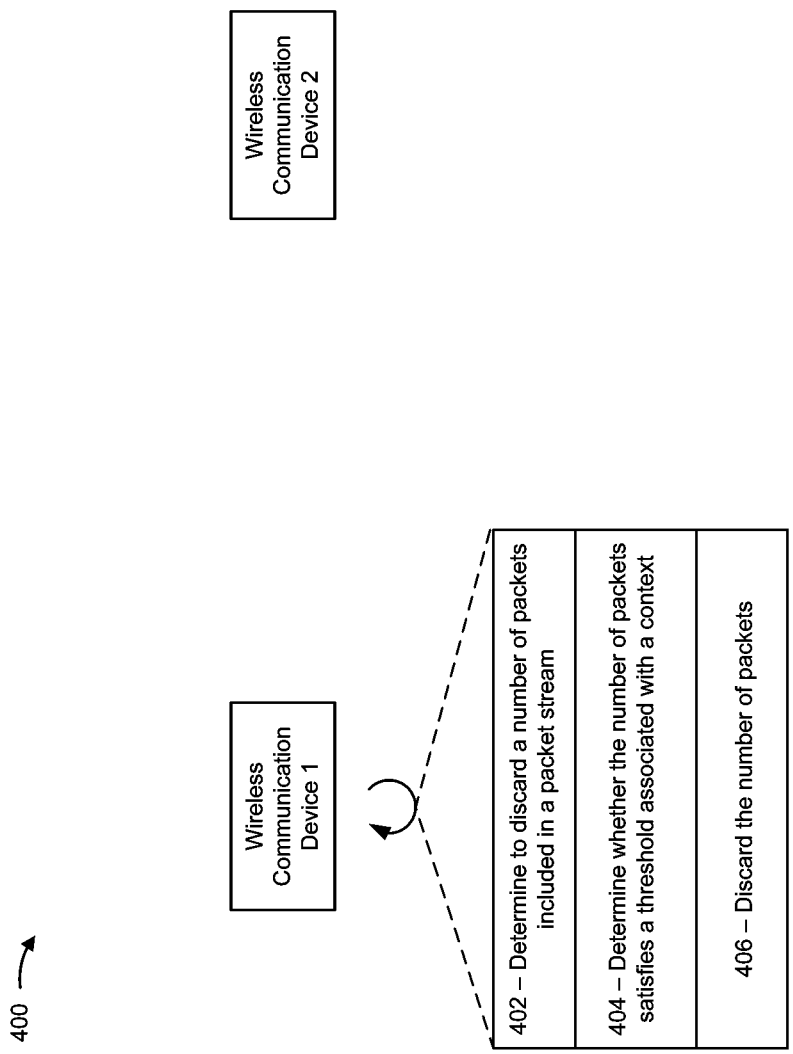
FIGS. 4A-4C are diagrams illustrating examples associated with selective re-compression of robust header compression (RoHC) packets, in accordance with various aspects of the present disclosure.
Figure 4B:
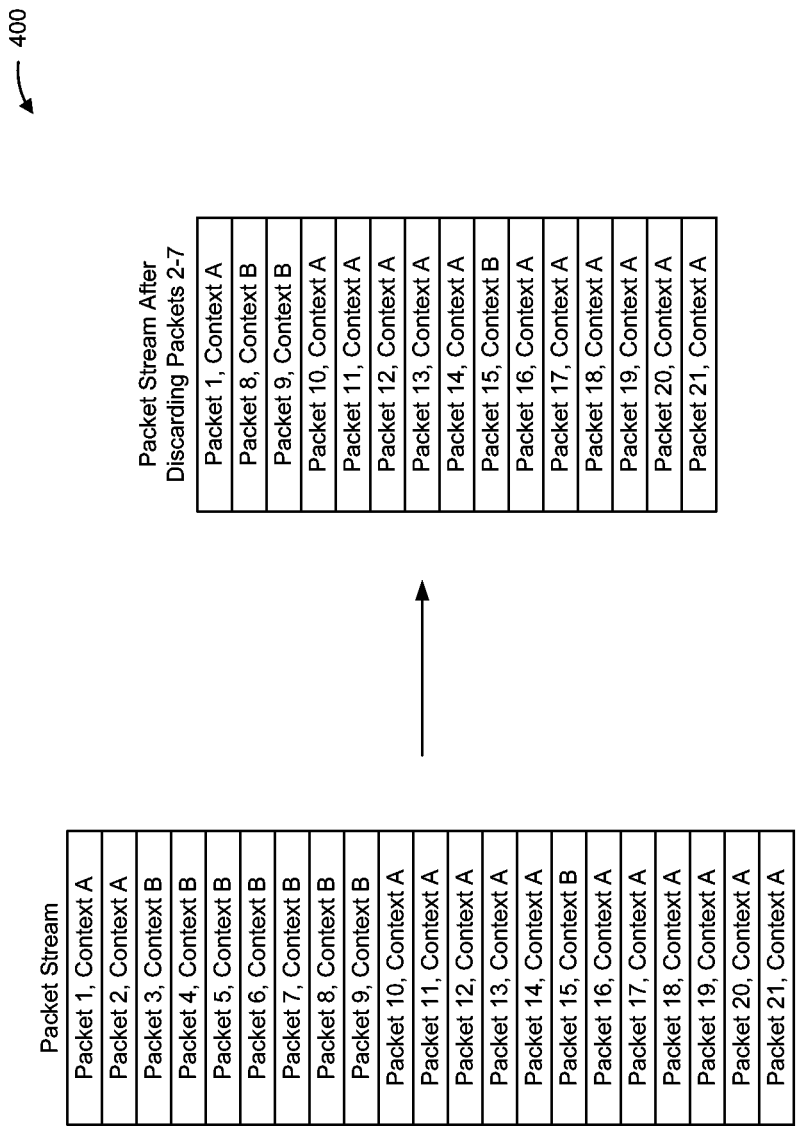
Figure 4C:
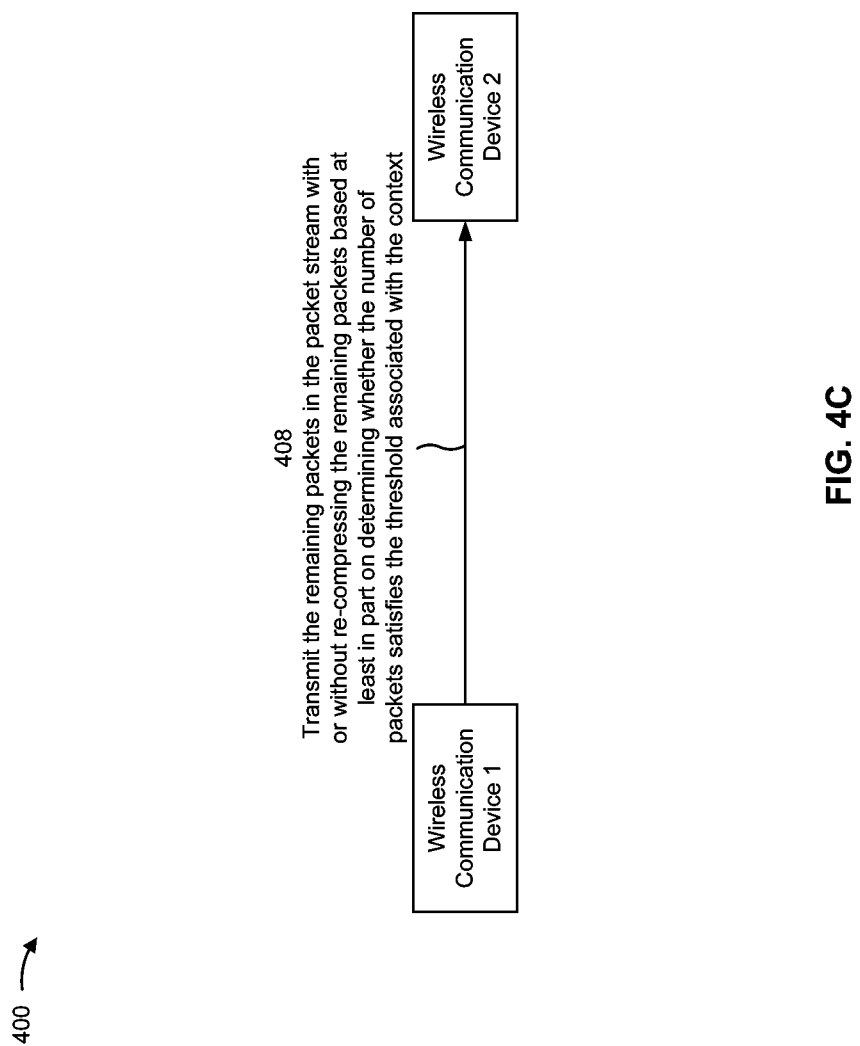

FIGS. 4A-4C are diagrams illustrating examples 400 associated with selective re-compression of RoHC packets, in accordance with various aspects of the present disclosure. As shown in FIGS. 4A-4C, example(s) 400 include communication between a plurality of wireless communication devices, such as wireless communication device 1 and wireless communication device 2. In some aspects, the wireless communication devices may be included in a wireless network, such as wireless network 100.

In some aspects, wireless communication device 1 may be a base station 110 and wireless communication device 2 may be a UE 120, or wireless communication device 1 may be a UE 120 and wireless communication device 2 may be a base station 110. In these cases, the wireless communication devices may communicate on a wireless access link, which may include an uplink and a downlink. In some aspects, wireless communication device 1 and wireless communication device 2 may each be a UE 120. In these cases, the wireless communication devices may communicate on a sidelink. In some aspects, wireless communication device 1 and wireless communication device 2 may each be a base station 110. In these cases, the wireless communication devices may communicate on a backhaul.

In some aspects, the wireless communication devices are capable of performing compression for packets that are transmitted between the wireless communication devices. In these cases, the wireless communication devices are capable of compressing and decompressing packets using one or more compression protocols or techniques, such as RoHC, EHC, UDC, one or more of the techniques described above in connection with FIG. 3, and/or the like. For example, wireless communication device 1 may generate a packet stream including a plurality of packets and may compress one or more of the packets prior to transmitting the packet stream to wireless communication device 2.

The packets included in the packet stream may be associated with one or more applications configured on wireless communication device 1, may be associated with one or more communication protocols, and/or the like. Moreover, each packet in the packet stream may be associated with a context (e.g., an RoHC context) which, as described above, may correspond to a flow of packets. In some aspects, the packets included in the packet stream are associated with the same context. In some aspects, subsets of packets in the packet stream are associated with different contexts.

As shown in FIG. 4A, and by reference number 402, wireless communication device 1 may determine to discard a number of packets included in the packet stream. Discarded packets are removed from the packet stream and are not transmitted to wireless communication device 2. In some aspects, wireless communication device 1 may determine to discard packets associated with one or more contexts. For example, wireless communication device 1 may determine to discard packets associated with a first context, may determine to discard packets associated with a second context, and/or the like.

In some aspects, wireless communication device 1 may determine to discard a packet from the packet stream for various reasons. In some examples, wireless communication device 1 may discard a packet based at least in part on expiration of a PDCP discard timer associated with the packet. As another example, wireless communication device 1 may discard a packet based at least in part on one or more application parameters, one or more quality of service (QoS) parameters, and/or other parameters.

As further shown in FIG. 4A, and by reference number 404, wireless communication device 1 may determine whether the number of packets satisfies a threshold associated with a context. In some aspects, wireless communication device 1 may determine whether the number of packets discarded from the packet stream for each context included in the packet stream satisfies an associated threshold. For example, wireless communication device 1 may determine whether a first number of packets discarded from the packet stream for a first context satisfies an associated threshold, may determine whether a second number of packets discarded from the packet stream for a second context satisfies an associated threshold, and so on.

The threshold for a particular context may be a threshold number of packets discarded from the packet stream (e.g., 5 packets, 7 packets, or another number of packets). In some aspects, the thresholds for a plurality of contexts may be the same number of packets. In some aspects, the thresholds for a plurality of contexts may be different numbers of packets.

In some aspects, the threshold for a particular context (or for a plurality of contexts) may be dynamic and may be based at least in part on a state or status of compression for wireless communication device 1. As an example, wireless communication device 1 may determine a threshold for a particular context based at least in part on one or more compression parameters associated with the context. The compression parameters may include, for example, a loss tolerance (or a number of packets) supported by the context. The loss tolerance for the context may be based at least in part on the compression protocol or technique that is used to compress packets for the context (e.g., the capability of wireless communication device 2 to accommodate lost or unreceived packets when decompressing packets for the context using the compression protocol or technique). In some aspects, the loss tolerance for the context can be traded off with the reordering tolerance. The trade-off (e.g., the reduction in loss tolerance and the corresponding gain in reordering tolerance or vice-versa) may be determined based at least in part on a parameter interpretation interval offset. Other examples of compression parameters include a number of bits used to compress the packets associated with the context, a compression profile used to compress the packets associated with the context, and/or the like.

As further shown in FIG. 4A, and by reference number 406, wireless communication device 1 may discard (or remove) the number of packets from the packet stream. In these cases, wireless communication device 1 may shift the order of packets in the packet stream upward, downward, may reorder the packet stream, and/or the like.

FIG. 4B illustrates an example of discarding packets from a packet stream. As shown in FIG. 4B, an example packet stream may include 21 packets. A subset of the packets may be associated with context A and another subset of packets may be associated with context B. In some cases, wireless communication device 1 may compress (e.g., using a compression protocol or technique such as RoHC, EHC, UDC, and/or the like) one or more of the packets included in the example packet stream.

As further shown in FIG. 4B, wireless communication device 1 may discard one or more packets from the packet stream. In the example illustrated in FIG. 4B, wireless communication device 1 may discard packets 2 through 8. Wireless communication device 1 may shift the remaining packets 9 through 21 upward or further up in the packet stream.

As shown in FIG. 4C, and by reference number 408, wireless communication device 1 may transmit the remaining packets in the packet stream to wireless communication device 2 after discarding the number of packets from the packet stream. Wireless communication device 1 may transmit the remaining packets with or without re-compressing the remaining packets. In some aspects, wireless communication device 1 may determine to re-compress the remaining based at least in part on determining whether the number of packets satisfies the threshold associated with the context. For example, wireless communication device 1 may re-compress the remaining packets based at least in part on determining that the number of packets satisfies the threshold. As another example, wireless communication device 1 may transit the remaining packets without re-compressing the remaining packets based at least in part on determining that the number of packets does not satisfy the threshold.

In some aspects, wireless communication device 1 may transit the remaining packets without re-compressing the remaining packets even if wireless communication device 1 determines that the number of packets satisfies the threshold associated with the context. In these examples, wireless communication device 1 may transmit the remaining packets without re-compressing the remaining packets if a particular number of packets discarded from the packet stream are uncompressed packets. The compression of a particular packet in the packet stream may be based at least in part on the compression of previously compressed packets in the packet stream. Thus, packets in the packet stream that are uncompressed are not considered when compressing subsequent packets. Accordingly, even if the number of packets discarded from the packet stream for a particular context satisfies an associated threshold, wireless communication device 2 may still be capable of decompressing the remaining packets for the context if the discarded packets are uncompressed packets (e.g., and do not affect the decompression of the remaining packets). In some aspects, wireless communication device 1 may determine which of the packets in the packet stream are likely to be discarded (e.g., based on particular applications, QoS parameters, and/or the like) and may keep the packets uncompressed so as to decrease the likelihood that wireless communication 1 will have to re-compress the remaining packets.

In some aspects, wireless communication device 1 may re-compress the remaining packets (or may transmit the remaining packets) on a context basis. For example, wireless communication device 1 may re-compress the remaining packets or may transmit the remaining packets for a first context based at least in part on determining whether the number of packets discarded from the packet stream for the first context satisfies a threshold for the first context, may re-compress the remaining packets or may transmit the remaining packets for a second context based at least in part on determining whether the number of packets discarded from the packet stream for the second context satisfies a threshold for the second context, and so on.

In this way, wireless communication device 1 may re-compress or may refrain from re-compressing packets for a particular context in a packet stream based at least in part on a number of packets discarded from the packet stream for the context. In this way, wireless communication device 1 can re-compress subsets of packets in the packet stream as opposed to the entire packet stream. Moreover, determining whether to re-compress packets in a packet stream on a context-by-context basis may result in fewer re-compressions, which reduces processing, memory, and battery resource usage of wireless communication device 1.

As indicated above, FIGS. 4A-4C are provided as one or more examples. Other examples may differ from what is described with respect to FIGS. 4A-4C.

FIG. 5 is a diagram illustrating an example process 500 performed, for example, by a wireless communication device, in accordance with various aspects of the present disclosure. Example process 500 is an example where the wireless communication device (e.g., base station 110, UE 120, and/or the like) performs operations associated with selective re-compression of RoHC packets.

As shown in FIG. 5, in some aspects, process 500 may include determining to discard a number of packets from a plurality of packets included in a packet stream, wherein the plurality of packets are associated with a context (block 510). For example, the wireless communication device (e.g., using transmit processor 220, receive processor 238, controller/processor 240, memory 242, receive processor 258, transmit processor 264, controller/processor 280 memory 282, and/or the like) may determine to discard a number of packets from a plurality of packets included in a packet stream, as described above. In some aspects, the plurality of packets are associated with a context.

As further shown in FIG. 5, in some aspects, process 500 may include determining that the number of packets to discard does not satisfy a threshold associated with the context (block 520). For example, the wireless communication device (e.g., transmit processor 220, receive processor 238, controller/processor 240, memory 242, receive processor 258, transmit processor 264, controller/processor 280 memory 282, and/or the like) may determine that the number of packets to discard does not satisfy a threshold associated with the context, as described above.

As further shown in FIG. 5, in some aspects, process 500 may include discarding the number of packets based at least in part on determining to discard the number of packets (block 530). For example, the wireless communication device (e.g., transmit processor 220, receive processor 238, controller/processor 240, memory 242, receive processor 258, transmit processor 264, controller/processor 280 memory 282, and/or the like) may discard the number of packets based at least in part on determining to discard the number of packets, as described above.

As further shown in FIG. 5, in some aspects, process 500 may include transmitting the plurality of packets after discarding the number of packets based at least in part on the determination that the number of packets does not satisfy the threshold (block 540). For example, the wireless communication device (e.g., transmit processor 220, receive processor 238, controller/processor 240, memory 242, receive processor 258, transmit processor 264, controller/processor 280 memory 282, and/or the like) may transmit the plurality of packets after discarding the number of packets based at least in part on the determination that the number of packets does not satisfy the threshold, as described above.

Process 500 may include additional aspects, such as any single aspect or any combination of aspects described below and/or in connection with one or more other processes described elsewhere herein.

In a first aspect, process 500 includes determining to discard a second number of packets from a second plurality of packets included in the packet stream, wherein the second plurality of packets is being compressed, and wherein the second number of packets and the second plurality of packets is being associated with a second context; determining that the second number of packets satisfies a threshold associated with the second context; and re-compressing the second plurality of packets after discarding the second number of packets based at least in part on determining that the second number of packets satisfies the threshold associated with the second context. In a second aspect, alone or in combination with the first aspect, the threshold associated with the context and the threshold associated with the second context are different thresholds.

In a third aspect, alone or in combination with one or more of the first and second aspects, process 500 includes dynamically is determining the threshold associated with the context based at least in part on at least one of: a number of bits is using to compress the plurality of packets, a loss tolerance for the plurality of packets, or a profile is using to compress the plurality of packets. In a fourth aspect, alone or in combination with one or more of the first through third aspects, the plurality of packets are compressed using RoHC, and the context is an RoHC context.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
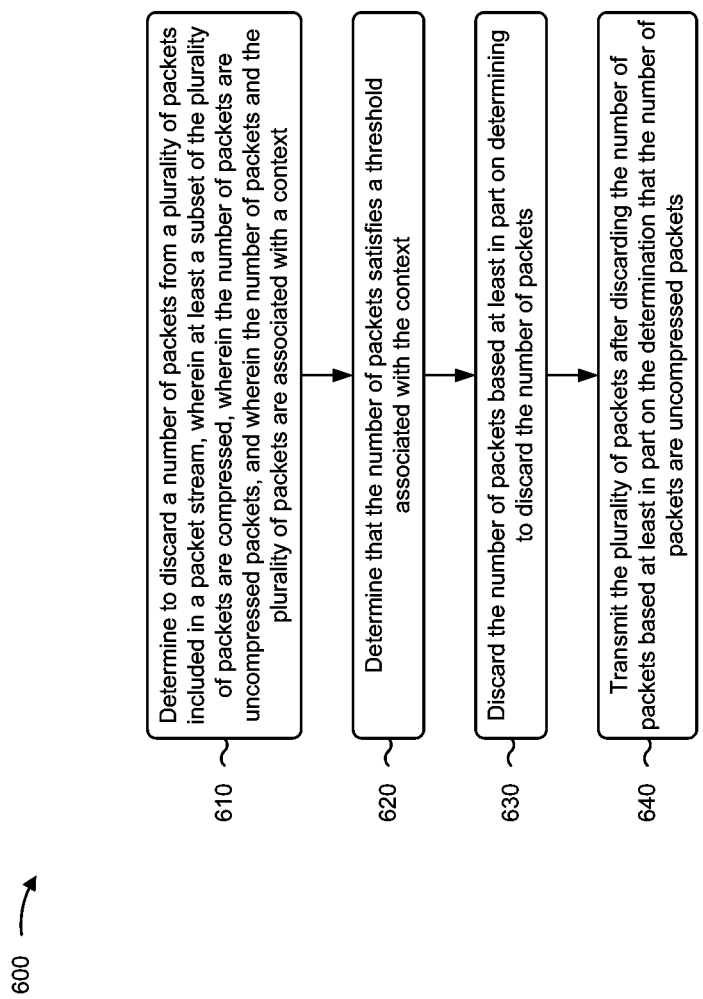

FIG. 6 is a diagram illustrating an example process 600 performed, for example, by a wireless communication device, in accordance with various aspects of the present disclosure. Example process 600 is an example where the wireless communication device (e.g., base station 110, UE 120, and/or the like) performs operations associated with selective re-compression of RoHC packets.

As shown in FIG. 6, in some aspects, process 600 may include determining to discard a number of packets from a plurality of packets included in a packet stream, wherein at least a subset of the plurality of packets are compressed, wherein the number of packets are uncompressed packets, and wherein the number of packets and the plurality of packets are associated with a context (block 610). For example, the wireless communication device (e.g., transmit processor 220, receive processor 238, controller/processor 240, memory 242, receive processor 258, transmit processor 264, controller/processor 280 memory 282, and/or the like) may determine to discard a number of packets from a plurality of packets included in a packet stream, as described above. In some aspects, at least a subset of the plurality of packets are compressed. In some aspects, the number of packets are uncompressed packets. In some aspects, the number of packets and the plurality of packets are associated with a context.

As further shown in FIG. 6, in some aspects, process 600 may include determining that the number of packets satisfies a threshold associated with the context (block 620). For example, the wireless communication device (e.g., transmit processor 220, receive processor 238, controller/processor 240, memory 242, receive processor 258, transmit processor 264, controller/processor 280 memory 282, and/or the like) may determine that the number of packets satisfies a threshold associated with the context, as described above.

As further shown in FIG. 6, in some aspects, process 600 may include discarding the number of packets based at least in part on determining to discard the number of packets (block 630). For example, the wireless communication device (e.g., transmit processor 220, receive processor 238, controller/processor 240, memory 242, receive processor 258, transmit processor 264, controller/processor 280 memory 282, and/or the like) may discard the number of packets based at least in part on determining to discard the number of packets, as described above.

As further shown in FIG. 6, in some aspects, process 600 may include transmitting the plurality of packets after discarding the number of packets based at least in part on the determination that the number of packets are uncompressed packets (block 640). For example, the wireless communication device (e.g., transmit processor 220, receive processor 238, controller/processor 240, memory 242, receive processor 258, transmit processor 264, controller/processor 280 memory 282, and/or the like) may transmit the plurality of packets after discarding the number of packets based at least in part on the determination that the number of packets are uncompressed packets, as described above.

Process 600 may include additional aspects, such as any single aspect or any combination of aspects described below and/or in connection with one or more other processes described elsewhere herein.

In a first aspect, process 600 includes dynamically is determining the threshold associated with the context based at least in part on at least one of: a number of bits is using to compress the plurality of packets, a loss tolerance for the plurality of packets, or a profile is using to compress the plurality of packets. In a second aspect, alone or in combination with the first aspect, the at least the subset of the plurality of packets are compressed using RoHC, and the context is an RoHC context.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
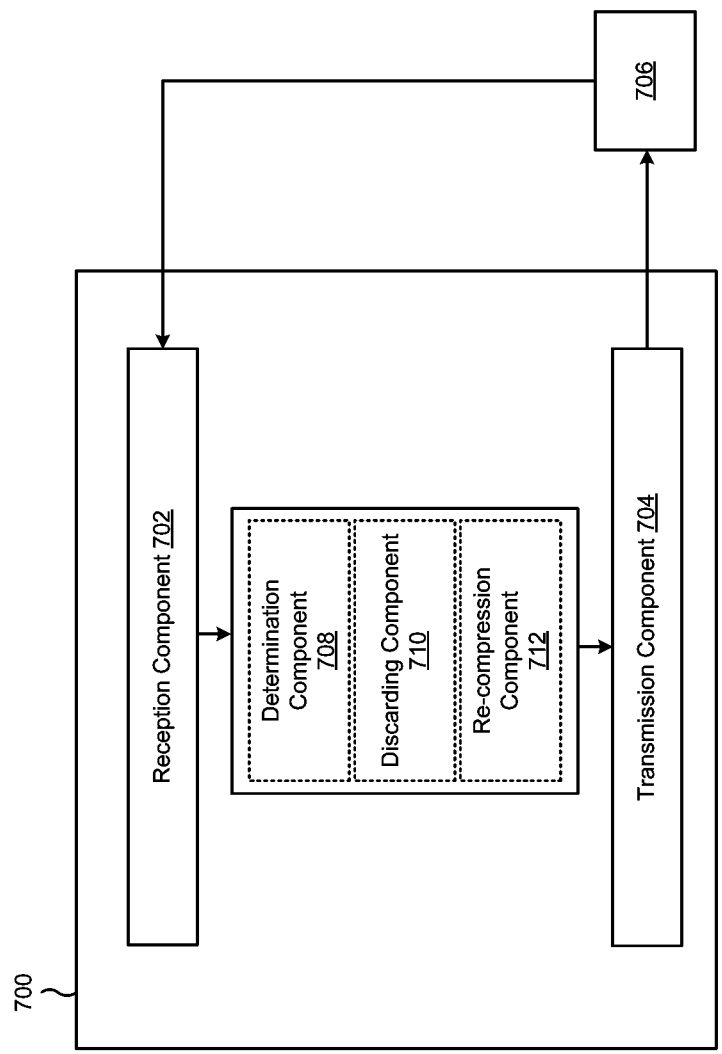
FIG. 7 is a block diagram of an example apparatus for wireless communication, in accordance with various aspects of the present disclosure.

FIG. 7 is a block diagram of an example apparatus 700 for wireless communication. The apparatus 700 may be a wireless communication device (e.g., a UE, a base station, or another wireless communication device), or a wireless communication device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708, a discarding component 710, or a re-compression component 712, among other examples.

In some aspects, the apparatus 700 may be configured to perform one or more operations described herein in connection with FIGS. 4A-4C. Additionally or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE 120 and/or the base station 110 described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE 120 and/or the base station 110 described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE 120 and/or the base station 110 described above in connection with FIG. 2. In some aspects, the transmission component 704 may be co-located with the reception component 702 in a transceiver.

In some aspects, the determination component 708 may determine to discard a number of packets from a plurality of packets included in a packet stream. The plurality of packets are associated with a context. The determination component 708 may determine that the number of packets to discard does not satisfy a threshold associated with the context. The discarding component 710 may discard the number of packets based at least in part the determination by determination component 708 to discard the number of packets. The transmission component 704 may transmit (e.g., to apparatus 706) the plurality of packets after discarding component 710 discards the number of packets based at least in part on the determination by determination component 708 that the number of packets does not satisfy the threshold.

In some aspects, the determination component 708 may determine to discard a number of packets from a plurality of packets included in a packet stream. The plurality of packets may be compressed and the number of packets and the plurality of packets may be associated with a context. The determination component 708 may determine that the number of packets satisfies a threshold associated with the context. The re-compressing component 712 may re-compress the plurality of packets after the discarding component 710 discards the number of packets based at least in part on the determination component 708 determining that the number of packets satisfies the threshold associated with the context.

In some aspects, the determination component 708 may determining to discard a number of packets from a plurality of packets included in a packet stream. At least a subset of the plurality of packets may be compressed, the number of packets may be uncompressed packets, and the number of packets and the plurality of packets may be associated with a context. The determination component 708 may determine that the number of packets satisfies a threshold associated with the context. The discarding component 710 may discard the number of packets based at least in part on the determination component 708 determining to discard the number of packets. The transmission component 704 may transmit the plurality of packets after the discarding component 710 discards the number of packets based at least in part on the determination component 708 determining that the number of packets are uncompressed packets.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
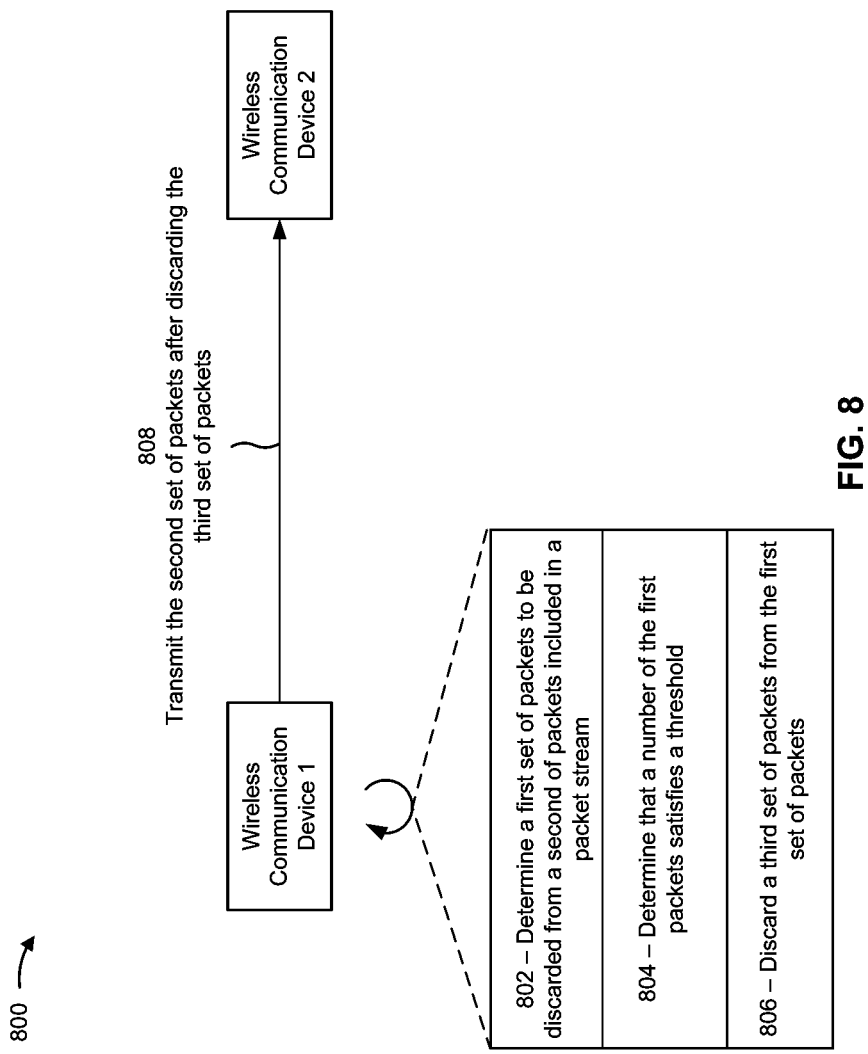
FIG. 8 is a diagram illustrating an example associated with maintaining RoHC packets, in accordance with various aspects of the present disclosure.

FIG. 8 is a diagram illustrating an example 800 associated with maintaining RoHC packets, in accordance with various aspects of the present disclosure. As shown in FIG. 8, example 800 includes communication between a plurality of wireless communication devices, such as wireless communication device 1 and wireless communication device 2. In some aspects, the wireless communication devices may be included in a wireless network, such as wireless network 100.

In some aspects, wireless communication device 1 may be a base station 110 and wireless communication device 2 may be a UE 120, or wireless communication device 1 may be a UE 120 and wireless communication device 2 may be a base station 110. In these cases, the wireless communication devices may communicate on a wireless access link, which may include an uplink and a downlink. In some aspects, wireless communication device 1 and wireless communication device 2 may each be a UE 120. In these cases, the wireless communication devices may communicate on a sidelink. In some aspects, wireless communication device 1 and wireless communication device 2 may each be a base station 110. In these cases, the wireless communication devices may communicate on a backhaul.

In some aspects, the wireless communication devices are capable of performing compression for packets that are transmitted between the wireless communication devices. In these cases, the wireless communication devices are capable of compressing and decompressing packets using one or more compression protocols or techniques, such as RoHC, EHC, UDC, one or more of the techniques described above in connection with FIG. 3, and/or the like. For example, wireless communication device 1 may generate a packet stream including a plurality of packets and may compress one or more of the packets prior to transmitting the packet stream to wireless communication device 2.

The packets included in the packet stream may be associated with one or more applications configured on wireless communication device 1, may be associated with one or more communication protocols, and/or the like. Moreover, each packet in the packet stream may be associated with a compression context (e.g., an RoHC context) which, as described above, may correspond to a flow of packets. In some aspects, the packets included in the packet stream are associated with the same compression context. In some aspects, subsets of packets in the packet stream are associated with different compression contexts.

As shown in FIG. 8, and by reference number 802, wireless communication device 1 may determine a first set (e.g., one or more) of packets to be discarded from a second set (e.g., one or more) of packets included in the packet stream. Discarded packets may include packets that are to be removed from the packet stream and are not to be transmitted to wireless communication device 2. In some aspects, wireless communication device 1 may determine to discard packets associated with one or more compression contexts. For example, wireless communication device 1 may determine to discard packets associated with a first compression context, may determine to discard packets associated with a second compression context, and/or the like.

In some aspects, wireless communication device 1 may determine to discard a packet from the packet stream for various reasons. In some examples, wireless communication device 1 may discard a packet based at least in part on expiration of a PDCP discard timer associated with the packet. As another example, wireless communication device 1 may discard a packet based at least in part on one or more application parameters, one or more QoS parameters, matching a packet filter, and/or other parameters. A packet filter may include Source/Destination, IP address and Port, as well as transport layer protocol (UDP/TCP) and may be referred to as five-tuple, may specify size of packets, time window of reception.

As further shown in FIG. 8, and by reference number 804, wireless communication device 1 may determine that a number (e.g., a quantity) of the first set of packets to be discarded satisfies a threshold. In some aspects, the threshold may be associated with a compression context and may include a compression threshold such as an RoHC threshold. The threshold may include, for example, a loss tolerance for the plurality of packets. The loss tolerance for the plurality of packets may correspond to a number of consecutive packets that is capable of being discarded from the plurality of packets associated with the compression context without wireless communication device 1 performing a re-compression of packets in the packet stream, or wireless communication device 2 not being able to decompress the packet as originally compressed. The number of consecutive packets that can be discarded may depend on the size of the sequence number used by RoHC, and may be as specified in IETF RFC 3095. As an example, if 14 packets are permitted to be discarded before a re-compression of the plurality of packets is to be performed, wireless communication device 1 may determine that the number of packets to be discarded satisfies the threshold if the number of packets to be discarded is 15 or more.

As further shown in FIG. 8, and by reference number 806, wireless communication device 1 may discard (or remove) a third set of packets from the second set of packets of the packet stream. In these cases, wireless communication device 1 may shift the order of packets in the packet stream upward, downward, may reorder the packet stream, and/or the like.

The third set of packets may be at least a subset of the first set of packets. In this way, wireless communication device 1 may receive a request to discard the first set of packets from the packet stream, and may actually discard (or remove) a subset of the first set of packets to avoid performing a re-compression of packets in the packet stream, which conserves memory and processing resources of wireless communication device 1. In particular, wireless communication device 1 discards a subset of the number of packets to be discarded such that the threshold is no longer satisfied. For example, if the threshold is 62 packets and the number of packets to be discarded is 64, wireless communication device 1 may discard 62 packets of the 64 packets such that a re-compression of the packets in the packet stream is not performed.

In some aspects, wireless communication device 1 may determine the number (e.g., the quantity) of the third set of packets to be discarded to be the threshold (e.g., the number or quantity of packets that can be tolerated). In some aspects, wireless communication device 1 may determine the number of the third set of packets to be a particular number or quantity of packets below the threshold. In some aspects, wireless communication device 1 may determine the number of the third set of packets to be a particular percentage of packets below the threshold.

In some aspects, wireless communication device 1 may discard the third set of packets from the packet stream at a particular rate. The rate may be a rate that satisfies the threshold (e.g., the loss tolerance for the second set of packets). As an example, if the loss tolerance is 31 packets, and wireless communication device 1 is to discard 34 packets from each of multiple pluralities of packets from the packet stream, wireless communication device 1 may discard packets up to packet number 28 (or a lesser packet number) in each of the multiple pluralities of packets. After discarding the 28 packets in a plurality of packets, wireless communication device 1 may maintain or keep the packets: 29, 30, and continue discarding thereafter. This ensures that if any of the 3 packets 28, 29, 30 successfully reach the decompressor, the state is maintained.

Keeping packets that were initially to be discarded may result in an increased traffic over the network, processing and memory overhead for wireless communication device 1. To reduce the increased processing and memory overhead, wireless communication device 1 may remove all or at least a part of IP packet payloads of the packets that wireless communication device 1 determined not to discard (e.g., a fourth set of packets to be discarded that wireless communication device 1 determined not to discard to avoid a re-compression, which may be a subset of the first set of packets different from the third set of packets). Wireless communication device 1 may keep the RoHC headers for these packets for use by an RoHC decompressor at wireless communication device 2. The removal of the payload reduces the size of data to transmit and is acceptable since the data was supposed to be discarded by the transmitter.

As further shown in FIG. 8, and by reference number 808, wireless communication device 1 may transmit the second set of packets to wireless communication device 2 after discarding the third set of packets from the second set of packets. In some aspects, wireless communication device 1 transmits the fourth set of packets in the second set of packets to wireless communication device 2 after removing all or a portion of the IP packet payloads of the fourth set of packets.

As indicated above, FIG. 8 is provided as an example. Other examples may differ from what is described with respect to FIG. 8.

Figure 9:
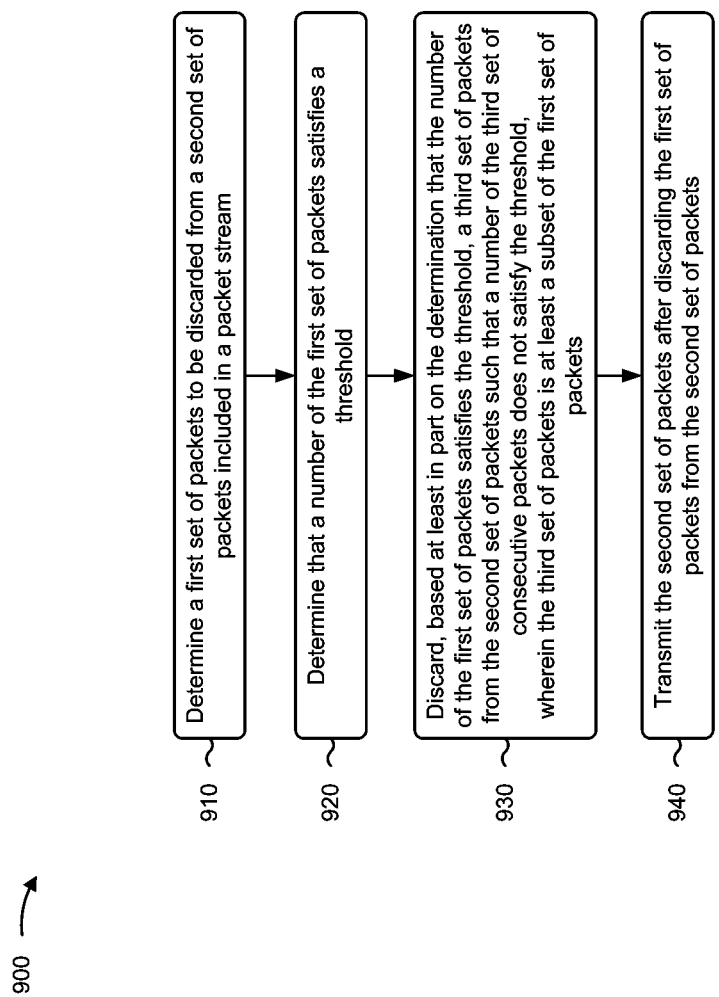
FIG. 9 is a diagram illustrating an example process associated with maintaining RoHC packets, in accordance with various aspects of the present disclosure.

FIG. 9 is a diagram illustrating an example process 900 performed, for example, by a wireless communication device, in accordance with various aspects of the present disclosure. Example process 900 is an example where the wireless communication device (e.g., base station 110, UE 120, and/or the like) performs operations associated with maintaining RoHC packets.

As shown in FIG. 9, in some aspects, process 900 may include determining a first set of packets to be discarded from a second set of packets included in a packet stream (block 910). For example, the wireless communication device (e.g., using transmit processor 220, receive processor 238, controller/processor 240, memory 242, receive processor 258, transmit processor 264, controller/processor 280 memory 282, and/or the like) may determine a first set of packets to be discarded from a second set of packets included in a packet stream, as described above.

As further shown in FIG. 9, in some aspects, process 900 may include determining that a number of the first set of packets satisfies a threshold (block 920). For example, the wireless communication device (e.g., transmit processor 220, receive processor 238, controller/processor 240, memory 242, receive processor 258, transmit processor 264, controller/processor 280 memory 282, and/or the like) may determine that a number of the first set of packets satisfies a threshold, as described above.

As further shown in FIG. 9, in some aspects, process 900 may include discarding, based at least in part on the determination that the number of the first set of packets satisfies the threshold, a third set of packets from the second set of packets such that a number of the third set of packets does not satisfy the threshold, wherein the third set of packets is at least a subset of the first set of packets (block 930). For example, the wireless communication device (e.g., transmit processor 220, receive processor 238, controller/processor 240, memory 242, receive processor 258, transmit processor 264, controller/processor 280 memory 282, and/or the like) may discard, based at least in part on the determination that the number of the first set of packets satisfies the threshold, a third set of packets from the second set of packets such that a number of the third set of packets does not satisfy the threshold, as described above. In some aspects, the third set of packets is at least a subset of the first set of packets.

As further shown in FIG. 9, in some aspects, process 900 may include transmitting the second set of packets after discarding the first set of packets from the second set of packets (block 940). For example, the wireless communication device (e.g., transmit processor 220, receive processor 238, controller/processor 240, memory 242, receive processor 258, transmit processor 264, controller/processor 280 memory 282, and/or the like) may transmit the second set of packets after discarding the first set of packets from the second set of packets, as described above.

Process 900 may include additional aspects, such as any single aspect or any combination of aspects described below and/or in connection with one or more other processes described elsewhere herein.

In a first aspect, the threshold is less or equal to a loss tolerance for the second set of packets. In a second aspect, alone or in combination with the first aspect, discarding the third set of packets comprises discarding packets from the first set of packets at a rate that satisfies the loss tolerance for the second set of packet. In a third aspect, alone or in combination with one or more of the first or second aspects, the method further includes removing at least a portion of an IP packet payload from each packet of fourth set of packets, wherein the fourth set of packets is at least a second subset of the first set of packets, and wherein the fourth set of packets are not discarded.

In a fourth aspect, alone or in combination with one or more of the first through third aspects, transmitting the second of packets after discarding the third set of packets comprises transmitting the second of packets after removing at least the portion of the IP packet payload from each packet of the fourth set of packets. In a fifth aspect, alone or in combination with one or more of the first through third aspects, the at least the subset of the plurality of the first set of packets are compressed using RoHC and associated with an RoHC context. In a sixth aspect, alone or in combination with one or more of the first through fifth aspects, at least a subset of the second set of packets are compressed. In a seventh aspect, alone or in combination with one or more of the first through sixth aspects, the first set of packets and the second set of packets are associated with a compression context.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
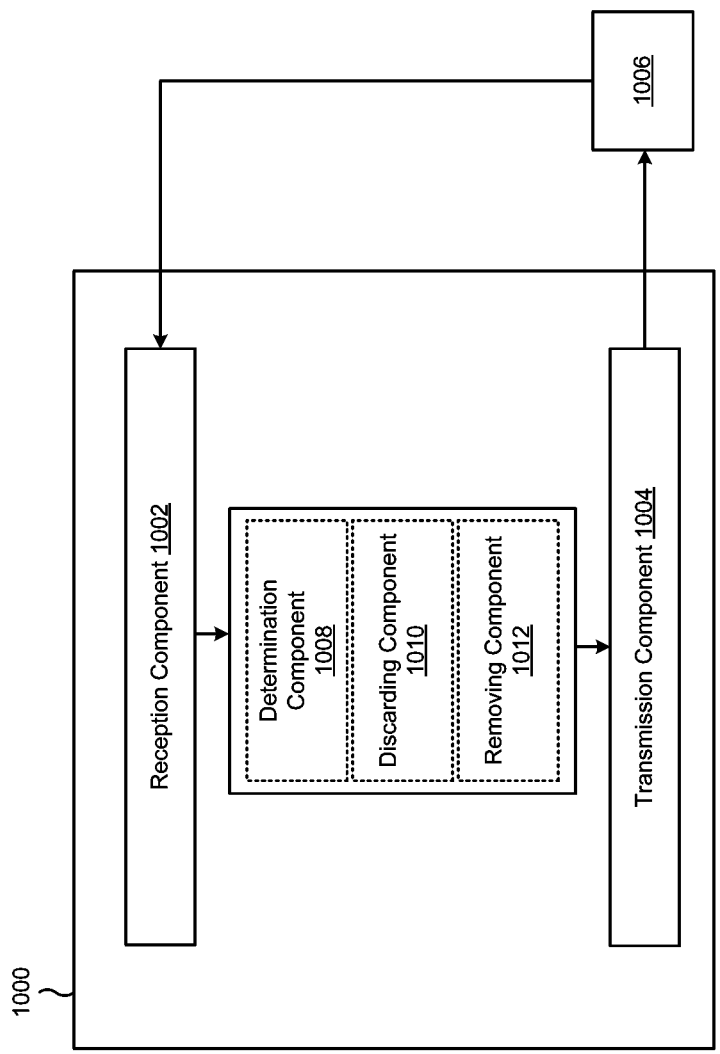
FIG. 10 is a block diagram of an example apparatus for wireless communication, in accordance with various aspects of the present disclosure.

FIG. 10 is a block diagram of an example apparatus 1000 for wireless communication. The apparatus 1000 may be a wireless communication device (e.g., a UE, a base station, or another wireless communication device), or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008, a discarding component 1010, and/or a removing component 1012, among other examples.

In some aspects, the apparatus 1000 may be configured to perform one or more operations described herein in connection with FIG. 8. Additionally or alternatively, the apparatus 1000 may be configured to perform one or more processes described herein, such as process 900 of FIG. 9. In some aspects, the apparatus 1000 and/or one or more components shown in FIG. 10 may include one or more components of the UE 120 and/or the base station 110 described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE 120 and/or the base station 110 described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE 120 and/or the base station 110 described above in connection with FIG. 2. In some aspects, the transmission component 1004 may be co-located with the reception component 1002 in a transceiver.

In some aspects, the determination component 1008 may determine a first set of packets to be discarded from a second set of packets included in a packet stream. The determination component 1008 may determine that a number of the first set of packets satisfies a threshold. The discarding component 1010 may discard a third set of packets based at least in part the determination by determination component 1008 that the first set of packets satisfies the threshold. A number of third set of packets does not satisfy the threshold and is at least a subset of the first set of packets. The transmission component 1004 may transmit (e.g., to apparatus 1006) the second of packets after the discarding component 1010 discards the third set of packets from the second set of packets.

In some aspects, the determination component 1008 discards packets from the plurality of packets at a rate that satisfies the threshold, which may correspond to a loss tolerance for the plurality of packets. In some aspects, the removing component 1012 removes at least a portion of an IP packet payload from each packet of a fourth set of the packets from the third set of packets.

The determination component 1008, the discarding component 1010, and/or the removing component 1012 may include (or may be included in) a controller/processor, a transmit processor, a receive processor, and/or a memory described above in the UE 120 and/or the base station 110 of FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a wireless communication device, comprising: determining to discard a number of packets from a plurality of packets included in a packet stream, wherein the plurality of packets are associated with a context; determining that the number of packets to discard does not satisfy a threshold associated with the context; discarding the number of packets based at least in part on determining to discard the number of packets; and transmitting the plurality of packets after discarding the number of packets based at least in part on the determination that the number of packets does not satisfy the threshold.

Aspect 2: The method of aspect 1, further comprising: determining to discard a second number of packets from a second plurality of packets included in the packet stream, wherein the second number of packets and the second plurality of packets are associated with a second context; determining that the second number of packets satisfies a threshold associated with the second context; and re-compressing the second plurality of packets after discarding the second number of packets based at least in part on determining that the second number of packets satisfies the threshold associated with the second context.

Aspect 3: The method of aspect 2, wherein the threshold associated with the context and the threshold associated with the second context are different thresholds. Aspect 4: The method of any of aspects 1-3, further comprising: dynamically determining the threshold associated with the context based at least in part on at least one of: a number of bits used to compress the plurality of packets, a loss tolerance for the plurality of packets, or a profile used to compress the plurality of packets. Aspect 5: The method of any of aspects 1-4, wherein the plurality of packets are compressed using robust header compression (RoHC); and wherein the context is an RoHC context.

Aspect 6: A method of wireless communication performed by a wireless communication device, comprising: determining to discard a number of packets from a plurality of packets included in a packet stream, wherein at least a subset of the plurality of packets are compressed, wherein the number of packets are uncompressed packets, and wherein the number of packets and the plurality of packets are associated with a context; determining that the number of packets satisfies a threshold associated with the context; discarding the number of packets based at least in part on determining to discard the number of packets; and transmitting the plurality of packets after discarding the number of packets based at least in part on the determination that the number of packets are uncompressed packets.

Aspect 7: The method of aspect 6, further comprising: dynamically determining the threshold associated with the context based at least in part on at least one of: a number of bits used to compress the plurality of packets, a loss tolerance for the plurality of packets, or a profile used to compress the plurality of packets. Aspect 8: The method of aspect 6 or 7, wherein the at least the subset of the plurality of packets are compressed using robust header compression (RoHC); and wherein the context is an RoHC context.

Aspect 14: A method of wireless communication performed by a wireless communication device, comprising: determining a first set of packets to be discarded from a second set of packets included in a packet stream; determining that a number of the first set of packets satisfies a threshold; discarding, based at least in part on the determination that the number of the first set of packets satisfies the threshold, a third set of packets from the second set of packets such that a number of the third set of packets does not satisfy the threshold, wherein the third set of packets is at least a subset of the first set of packets; and transmitting the second set of packets after discarding the first set of packets from the second set of packets.

Aspect 15: The method of aspect 14, wherein at least a subset of the second set of packets are compressed. Aspect 16: The method of aspect 14 or 15, wherein the first set of packets and the second set of packets are associated with a compression context. Aspect 17: The method of any of aspects 14-16, wherein the threshold is less or equal to a loss tolerance for the second set of packets. Aspect 18: The method of aspect 17, wherein discarding the third set of packets comprises: discarding packets from the first set of packets at a rate that satisfies the loss tolerance for the second set of packets.

Aspect 19: The method of any of aspects 14-18, further comprising: removing at least a portion of an Internet protocol (IP) packet payload from each packet of fourth set of packets, wherein the fourth set of packets is at least a second subset of the first set of packets, and wherein the fourth set of packets are not discarded. Aspect 20: The method of aspect 19, wherein transmitting the second of packets after discarding the third set of packets comprises: transmitting the second of packets after removing at least the portion of the IP packet payload from each packet of the fourth set of packets. Aspect 21: The method of any of aspects 14-20, wherein at least a subset of the first set of packets are compressed using robust header compression (RoHC) and associated with an RoHC context; and wherein the compression context is an RoHC context.

Aspect 22: An apparatus for wireless communication at a device, comprising a processor; memory coupled with the processor; and instructions stored in the memory and executable by the processor to cause the apparatus to perform the method of one or more aspects of aspects 1-21. Aspect 23: A device for wireless communication, comprising a memory and one or more processors coupled to the memory, the memory and the one or more processors configured to perform the method of one or more aspects of aspects 1-21.

Aspect 24: An apparatus for wireless communication, comprising at least one means for performing the method of one or more aspects of aspects 1-21. Aspect 25: A non-transitory computer-readable medium storing code for wireless communication, the code comprising instructions executable by a processor to perform the method of one or more aspects of aspects 1-21. Aspect 26: A non-transitory computer-readable medium storing a set of instructions for wireless communication, the set of instructions comprising one or more instructions that, when executed by one or more processors of a device, cause the device to perform the method of one or more aspects of aspects 1-21.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
    determining to discard a number of packets from a set of packets included in a packet stream,
        wherein the set of packets comprises a first plurality of packets that are associated with a first context and a second plurality of packets that are associated with a second context, and
        wherein the number of packets comprises a first number of packets from the first plurality of packets and are associated with the first context and a second number of packets from the second plurality of packets;
    determining whether to re-compress the first plurality of packets based at least in part on whether the first number of packets from the first context that are determined to be discarded satisfies a first threshold number of packets associated with the first context;
determining whether to re-compress the second plurality of packets based at least in part on whether the second number of packets from the second context that are determined to be discarded satisfies a second threshold number of packets associated with the second context;
discarding the number of packets based at least in part on determining to discard the number of packets; and
transmitting the set of packets after discarding the number of packets based at least in part on a determination to refrain from re-compressing the first plurality of packets based at least in part on the first number of packets not satisfying the first threshold number of packets associated with the first context.

2. The method of claim 1, further comprising:
determining to re-compress the second plurality of packets based at least in part on the second number of packets satisfying the second threshold number of packets associated with the second context; and
re-compressing the second plurality of packets after discarding the second number of packets based at least in part on the second number of packets satisfying the second threshold number of packets associated with the second context.

3. The method of claim 2, wherein the first threshold number of packets associated with the first context and the second threshold number of packets associated with the second context are different thresholds.

4. The method of claim 1, further comprising:
dynamically determining the first threshold number of packets associated with the first context based at least in part on at least one of:
a number of bits used to compress the first plurality of packets,
a loss tolerance for the first plurality of packets, or
a profile used to compress the first plurality of packets.

5. The method of claim 1, wherein the first plurality of packets are compressed using robust header compression (RoHC);
wherein the first context is an RoHC context; and
wherein the first plurality of packets are RoHC packets.

6. A wireless communication device for wireless communication, comprising:
one or more memories; and
one or more processors operatively coupled to the one or more memories, the one or more memories and the one or more processors configured to:
determine to discard a number of packets from a set of packets included in a packet stream,
wherein the set of packets comprises a first plurality of packets that are associated with a first context and a second plurality of packets that are associated with a second context, and
wherein the number of packets comprises a first number of packets from the first plurality of packets and are associated with the first context and a second number of packets from the second plurality of packets;
determine whether to re-compress the first plurality of packets based at least in part on whether the first number of packets from the first context that are determined to be discarded satisfies a first threshold number of packets associated with the first context;
determine whether to re-compress the second plurality of packets based at least in part on whether the second number of packets from the second context that are determined to be discarded satisfies a second threshold number of packets associated with the second context;
discard the number of packets based at least in part on determining to discard the number of packets; and
transmit the set of packets after discarding the number of packets based at least in part on a determination to refrain from re-compressing the first plurality of packets based at least in part on the first number of packets not satisfying the first threshold number of packets associated with the first context.

7. The wireless communication device of claim 6, wherein the one or more processors are further configured to:
determine to re-compress the second plurality of packets based at least in part on the second number of packets satisfying the second threshold number of packets associated with the second context; and
re-compress the second plurality of packets after discarding the second number of packets based at least in part on the second number of packets satisfying the second threshold number of packets associated with the second context.

8. The wireless communication device of claim 7, wherein the first threshold number of packets associated with the first context and the second threshold number of packets associated with the second context are different thresholds.

9. The wireless communication device of claim 6, wherein the one or more processors are further configured to:
dynamically determine the first threshold number of packets associated with the first context based at least in part on at least one of:
a number of bits used to compress the first plurality of packets,
a loss tolerance for the first plurality of packets, or
a profile used to compress the first plurality of packets.

10. The wireless communication device of claim 6, wherein the first plurality of packets are compressed using robust header compression (RoHC);
wherein the first context is an RoHC context; and
wherein the first plurality of packets are RoHC packets.

11. A non-transitory computer-readable medium storing a set of instructions for wireless communication, the set of instructions comprising:
one or more instructions that, when executed by one or more processors of a wireless communication device, cause the wireless communication device to:
determine to discard a number of packets from a set of packets included in a packet stream,
wherein the set of packets comprises a first plurality of packets that are associated with a first context and a second plurality of packets that are associated with a second context, and
wherein the number of packets comprises a first number of packets from the first plurality of packets and are associated with the first context and a second number of packets from the second plurality of packets;
determine whether to re-compress the first plurality of packets based at least in part on whether the first number of packets from the first context that are determined to be discarded satisfies a first threshold number of packets associated with the first context;
determine whether to re-compress the second plurality of packets based at least in part on whether the second number of packets from the second context that are determined to be discarded satisfies a second threshold number of packets associated with the second context;
    discard the number of packets based at least in part on determining to discard the number of packets; and
    transmit the set of packets after discarding the number of packets based at least in part on a determination to refrain from re-compressing the first plurality of packets based at least in part on the first number of packets not satisfying the first threshold number of packets associated with the first context.

12. The non-transitory computer-readable medium of claim 11, wherein the one or more instructions further cause the wireless communication device to:
    determine to re-compress the second plurality of packets based at least in part on the second number of packets satisfying the second threshold number of packets associated with the second context; and
    re-compress the second plurality of packets after discarding the second number of packets based at least in part on the second number of packets satisfying the second threshold number of packets associated with the second context.

13. The non-transitory computer-readable medium of claim 12, wherein the first threshold number of packets associated with the first context and the second threshold number of packets associated with the second context are different thresholds.

14. The non-transitory computer-readable medium of claim 11, wherein the one or more instructions further cause the wireless communication device to:
    dynamically determine the first threshold number of packets associated with the first context based at least in part on at least one of:
        a number of bits used to compress the first plurality of packets,
        a loss tolerance for the first plurality of packets, or
        a profile used to compress the first plurality of packets.

15. The non-transitory computer-readable medium of claim 11, wherein the first plurality of packets are compressed using robust header compression (RoHC);
    wherein the first context is an RoHC context; and
    wherein the first plurality of packets are RoHC packets.

16. An apparatus for wireless communication, comprising:
    means for determining to discard a number of packets from a set of packets included in a packet stream,
        wherein the set of packets comprises a first plurality of packets that are associated with a first context and a second plurality of packets that are associated with a second context, and
        wherein the number of packets comprises a first number of packets from the first plurality of packets and are associated with the first context and a second number of packets from the second plurality of packets;
    means for determining whether to re-compress the first plurality of packets based at least in part on whether the first number of packets from the first context that are determined to be discarded satisfies a first threshold number of packets associated with the first context;
    means for determining whether to re-compress the second plurality of packets based at least in part on whether the second number of packets from the second context that are determined to be discarded satisfies a second threshold number of packets associated with the second context;
    means for discarding the number of packets based at least in part on determining to discard the number of packets; and
    means for transmitting the set of packets after discarding the number of packets based at least in part on a determination to refrain from re-compressing the first plurality of packets based at least in part on the first number of packets not satisfying the first threshold number of packets associated with the first context.

17. The apparatus of claim 16, further comprising:
    means for determining to re-compress the second plurality of packets based at least in part on the second number of packets satisfying the second threshold number of packets associated with the second context; and
    means for re-compressing the second plurality of packets after discarding the second number of packets based at least in part on the second number of packets satisfying the second threshold number of packets associated with the second context.

18. The apparatus of claim 17, wherein the first threshold number of packets associated with the first context and the second threshold number of packets associated with the second context are different thresholds.

19. The apparatus of claim 16, further comprising:
    means for dynamically determining the first threshold number of packets associated with the first context based at least in part on at least one of:
        a number of bits used to compress the first plurality of packets,
        a loss tolerance for the first plurality of packets, or
        a profile used to compress the first plurality of packets.

20. The apparatus of claim 16, wherein the first plurality of packets are compressed using robust header compression (RoHC);
    wherein the first context is an RoHC context; and
    wherein the first plurality of packets are RoHC packets.

* * * * *